Nov. 26, 1935.  E. M. SPLAINE  2,022,163
OPHTHALMIC MOUNTING
Filed May 12, 1934  2 Sheets-Sheet 2
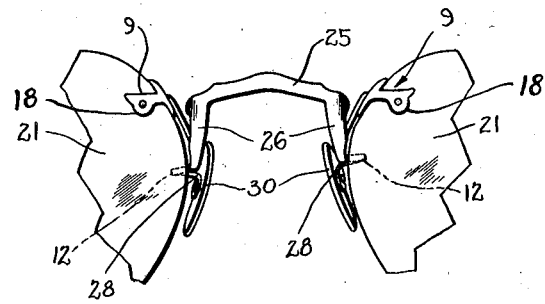
FIG. V.
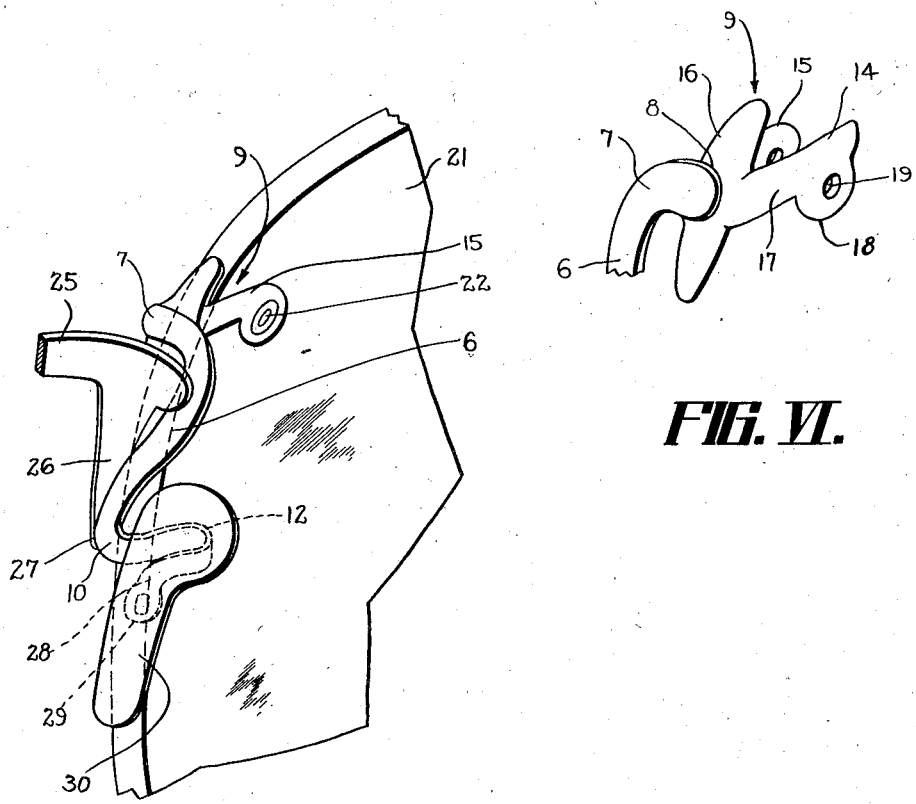
FIG. VI.
FIG. VII.
INVENTOR
Edward M. Splaine
BY
Harry H. Styll
ATTORNEY Patented Nov. 26, 1935

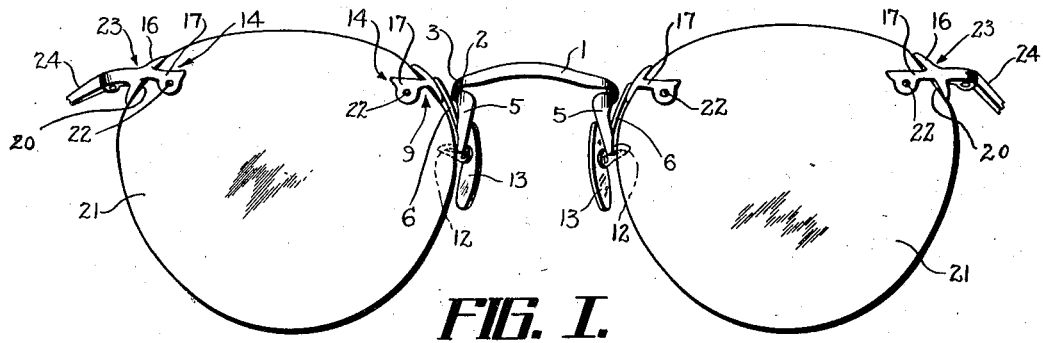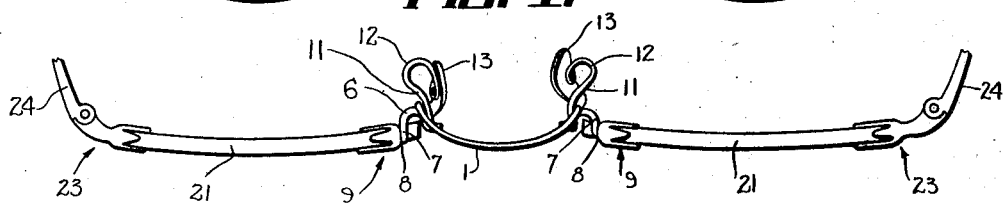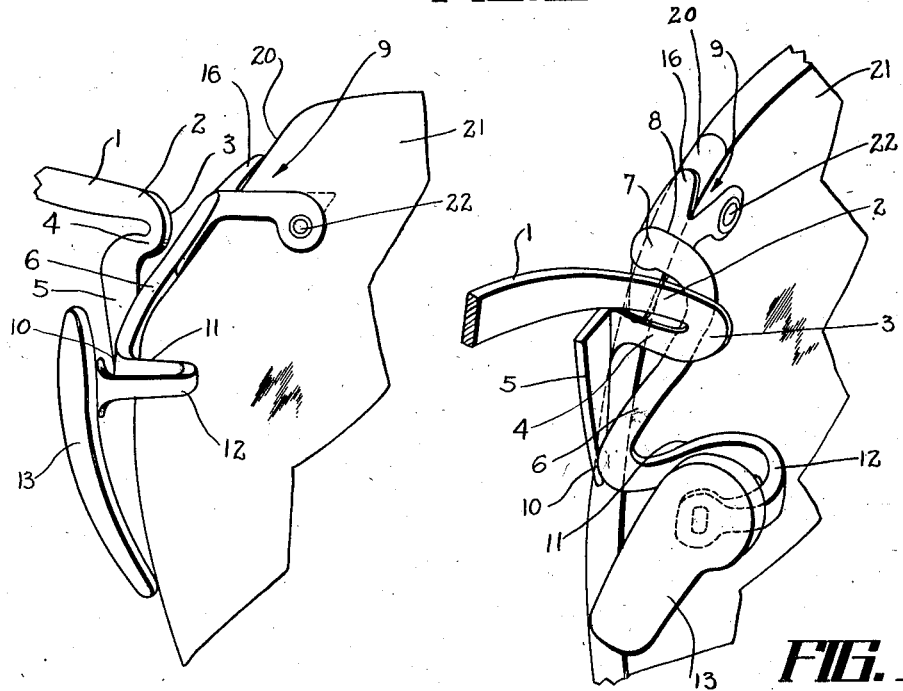

2,022,163

UNITED STATES PATENT OFFICE 2,022,163

OPHTHALMIC MOUNTING

Edward M. Splaine, Southbridge, Mass., assignor to American Optical Company, Southbridge, Mass., a voluntary association of Massachusetts Application May 12, 1934, Serial No. 725,367

10 Claims. (Cl. 88—43)

This invention relates to improvements in means for supporting ophthalmic lenses or the like before the eyes of the wearer and to an improved method of arranging and assembling said supporting means.

One of the principal objects of the invention is to provide an ophthalmic mounting having its lens holding means positioned in horizontal streamline relation with each other above the useful field of vision in combination with an improved bridge member having adjustable means for positioning and supporting the mounting in desired relation with the eyes of the wearer and arranged in such a manner that the adjustable means will be substantially invisible and inconspicuous when on the face of the wearer.

Another object of the invention is to provide improved means for supporting ophthalmic lenses or the like before the eyes of the wearer whereby a plurality of differently designed main bridge portions may be provided for ready attachment with the supporting means without altering said means.

Another object is to provide an improved bridge member having adjustable lens, guard and arch supporting portions, which may be adjusted independently of each other to the facial requirements of the wearer and which will be substantially invisible and inconspicuous when in use.

Another object is to provide means whereby the width of the central arch portion of the bridge member of mountings of the above character may be greatly reduced.

Another object is to provide a single mounting which may be adjusted to the requirements of most individuals, which will obviate the necessity of having to keep on hand a large stock of different sizes and designs as has been usual in the past, and which will require only a small investment on the part of the dispenser.

Other objects and advantages of the invention will become apparent from the following description taken in connection with the accompanying drawings, and it will be apparent that many changes and modifications in the arrangement and construction of parts and methods shown and described may be made without departing from the spirit of the invention as expressed in the accompanying claims. I, therefore, do not wish to be limited to the exact details of construction, arrangement of parts and methods shown and described as the preferred forms only have been shown by way of illustration.

Referring to the drawings:

Fig. I is a front view of an ophthalmic mounting embodying the invention;

Fig. II is a plan view of the mounting shown in Fig. I;

Fig. III is a fragmentary enlarged rear view of the adjustable means for supporting the lens holding means, bridge and nose guards of the mounting;

Fig. IV is a rear perspective view of the structure shown in Fig. III;

Fig. V is a fragmentary front elevation of a modified form of the invention;

Fig. VI is an enlarged perspective view of one of the lens straps or lens holding members;

Fig. VII is a view similar to Fig. IV of the structure shown in Fig. V.

Much difficulty has been encountered in the past in providing a suitable bridge member for an ophthalmic mounting having its lens holding means or straps fitted and attached to the lenses above the useful field of vision. The main difficulty has been in providing suitable adjustable supporting means for the various parts of the bridge member and of attaching the said bridge member to the lens holding means or strap so that it may be adjusted and fitted to the facial requirements of the wearer and yet be of such a nature that the adjustable parts thereof will be substantially invisible and inconspicuous when in use.

It, therefore, is one of the primary objects of this invention to provide a bridge member having suitable separately adjustable supporting means and an improved method of adjusting said means to the facial requirements of the wearer and for simultaneously locating the adjustable parts thereof at a position wherein they will be substantially invisible and inconspicuous when in use.

Referring more particularly to the drawings wherein similar reference characters designate corresponding parts throughout the several views, the device embodying the invention, as shown in Figures I to IV inclusive, comprises a central arch portion 1 having rearwardly extending end portions 2 which are looped at 3 and turned forwardly to form the forwardly extending portions 4. The said portions 4 are bent sidewise adjacent the front ends thereof and in the direction of the center of the bridge member and are extended downwardly relative to the portions 4 to form the depending side portions 5. The said depending portions 5 are attached adjacent their lower ends and at the rear thereof by solder or like means to adjustable supporting arms 6 and are intended to act as shields for concealing the arms 6 from view when the mounting is on the face. The said arms 6 are provided adjacent their tops with forwardly extending portions 7 which are attached at 8 to the lens holding means or lens straps 9. The arms 6 extend downwardly substantially to the shape of the contour edge of the lens when viewed from the front and extend forwardly at 10 for attachment to the depending portions 5. The said arms 6, adjacent their attaching points 10, are bent rearwardly to form an adjustable guard arm 11 which is looped forwardly at 12 substantially in a horizontal plane and in a direction inwardly of the ends of the depending portions 5 to produce forwardly extending adjustable terminal portions to which the nose guards or pads 13 are loosely or rigidly attached.

The arms 6 are shaped to the general contour of the lenses and to lie in a plane behind the plane of the portions 5 and when in proper adjusted position are adapted to be concealed by said portions 5 and rendered substantially invisible and inconspicuous when on the face of the wearer. The arms 6 are relatively long so as to provide a wide range of adjustment and are of sufficient rigidity to properly support the lenses before the eyes. It is apparent that by adjustment of the arms 6 sidewise between the point 7 and the point 10, the distance between the lenses may be varied and fitted to the requirements of the wearer. By bending the arm 6 to shorten the distance between the point 7 and the point 10, it is apparent that the central arch portion 1 may be raised or lowered and that by adjustment of the point 10 rearwardly or forwardly the said central arch portion 1 may be adjusted inwardly or outwardly as desired. It is also apparent that by adjustment of the loop portion 3 the central arch portion 1 may be raised or lowered independently of the arms 6 and may also be adjusted outwardly or inwardly as desired. This outward and inward adjustment may also be accomplished by bending the depending portions 5 inwardly or outwardly to compensate for slight variations. The arms 6 are so constructed that after the lenses have been properly spaced and the bridge member properly adjusted, they may be adjusted by bending the loop portions 12 to fit the nose guards or pads to the requirements of the wearer without altering the previous adjustments. By proper adjustment of the loop portions 12 the nose pads or guards 13 may be raised or lowered, deflected inwardly or outwardly or adjusted sidewise, or angled as desired. In all instances care is taken during the adjustment of the several parts that the adjustable portions of the arms 6 will lie behind the depending portions 5 and will follow the general contour of the lenses so as to be as inconspicuous as possible when on the face. It is apparent that although applicant has shown and described the arm 11 as having only a single loop 12 which terminates in a forwardly extending attaching end for the nose guard or pad 13, the said arm may be provided with an additional downwardly extending portion 28, as shown in Fig. VII, if desired, to position the attaching end below the plane of the loop portion 12.

Due to the fact that the supporting arms 6 are formed of a single piece of material to which the depending portions 5 of the bridge member are attached, it is apparent that several differently designed bridge members may be provided for ready attachment at 10 to the said arms. To interchange the bridge members it is merely necessary to heat the parts at 10 to cause the solder attaching means to melt whereupon another bridge member of a different design may be attached to the arms.

In Fig. VI, there is shown an enlarged view of the lens holding means or strap 9. The said strap is provided with spaced lens face engaging portions 14 and 15 and with a lens edge engaging portion 16. The portions 14 and 15 which are adapted to engage with the front and back faces respectively of the lens are provided with a relatively straight portion 17 which terminates in a downwardly extending portion 18 having a perforation 19 therein by means of which the portions 14 and 15 may be attached to the lens by a screw or other suitable means. The relatively straight portion 17 is adapted to lie substantially in a horizontal plane to produce a pleasing streamline effect when on the lens.

The lens holding members 9 are fitted to special seats 20 formed on the lenses 21 and are held thereon by attaching means 22 such as screws, solder or other means positioned in the aligned openings in the lens face engaging portions and in said lenses. The lenses 21, adjacent their temporal sides, are provided with similar specially formed attaching seats to which the lens holding or attaching means 23 for the temples 24 are attached.

Attention is directed to the fact that the central arch portion 1 may be formed rigid or resilient as desired and that the said arms 6 may have portions thereof formed rigid or resilient as desired.

In forming and fitting applicant's mounting each lens is first surfaced to the prescriptive requirements of the patient. Its optical axis and other prescriptive elements are then located and laid out on the lens. The shape of the lens is then carefully laid out in relation to the optical properties thereof and to determine the positions of the specially shaped attaching seats. The lens is then placed in a lens cutter and carefully cut to shape. It is then placed in an edging machine and carefully edged to shape. This locating and fixing of the lens seats is a very important procedure requiring expert skill and accuracy as the lens must be shaped about a predetermined center and the connecting zones or seats must be located in such a position as to support the lens in accurate prescriptive relation with the eye. The lens holding means or straps 9 and 23 are then fitted to the specially shaped seats and to the surfaces of the lens by bending the edge and surface engaging portions 14, 15, and 16 to the shape required. The location of the connecting openings in the lens are then determined, marked and drilled at the required distances from the edges of the seats.

The straps are again fitted to the connecting seats, and in the case of screw connections to the lens they are adjusted to obtain exact alignment of the strap connecting openings with the openings in the lens. The connecting screws are then inserted in the aligned openings and the straps checked for alignment of parts and tried to determine their fit relative to the edges of the lens. If the parts are not in proper relation the screws are loosened, the final altering adjustments are made, and the straps are then permanently secured in fixed relation with the lens.

In all instances the mounting must be accurately fitted to the face of the wearer prior to its use. This fitting is very important and is one of the factors requiring great skill and technical training. Extreme care must be taken that the lenses are supported in accurate prescribed relation with the eyes, particularly lenses having prismatic or cylindrical corrections which require true axial alignment with the eyes or lenses of the bifocal or trifocal type having different focal fields which must be placed in accurate relation with the eyes. These lenses are very expensive and great care must be taken that they are not broken during the forming and fitting of the mounting. In adjusting the mounting to the facial requirements of the wearer the lenses are first adjusted to a position wherein the distance between their centers is equal to the distance between the pupils of the eyes. This adjustment is accomplished by bending the upper portions of the depending arms 6 and also by adjustment of the loop portions 3 sidewise. This adjustment in some instances will move the depending portions of the arms 6 from their desired relation with the depending portions 5 and contour edges of the lenses and will in some instances require altering. If alterations are necessary care is taken that they do not change the adjusted distance between the centers of the lenses, etc. The nose guards are then adjusted to fit the wearer's nose and to support the centers of the lenses in aligned relation with the pupils of the eyes. This adjustment is accomplished by bending the loop portions 12 to raise or lower or adjust the guards in and out or sidewise as desired. In forming this adjustment great care must be taken that the guards are so positioned that they support the centers of the lenses in line with straight ahead vision of the eyes and that the pressure thereof on the nose will be distributed equally and over a large area so as to prevent their cutting into the flesh and hurting the wearer. Attention is then directed to the arch portion 1 to determine its height and general relation with the nose. If it is at an improper height or if not in accurate position in or out with respect to the nose, the said loop portions 3 are bent up or down or in or out in a direction normal to the plane of the lenses to a position wherein the arch will be located in desired relation with the nose. In forming this adjustment care is taken that it does not alter the adjusted distance between the centers of the lenses, etc. It is apparent that the adjustment for the height of the arch portion 1 and the position thereof in or out with respect to the nose may be made previous to the adjustment of the guards to the nose. The arch adjustments in this instance will be made by adjusting the depending portions of the arms 6 to shorten the distance between the points 7 and 10 and by adjusting the said arms 6 in or out as desired.

When the general fitting adjustments have been completed the various loops and portions are carefully observed when on the face of the wearer to determine if they are located in such a position as to be as inconspicuous as possible. Slight alterations necessary to accomplish this result are made and the mounting is then ready for use.

It is apparent that the various adjustable elements, when in the hands of a person skilled in the art, provide means whereby a wide range of adjustments may be accomplished and that a single mounting may be adjusted to the requirements of most individuals. This type of mounting requires only a small investment on the part of the dispenser as it obviates the necessity of having to keep on hand a large stock of different sizes as has been usual in the past. Through the provision of several differently designed central arch portions or bridge members and due to the mechanical structure of the mounting, several differently designed mountings may be made by merely interchanging said bridge members. This greatly decreases the cost and stock requirement of such mountings. The structure is so arranged as to enable the portions 17 of the lens holding members 9 and 23 to be positioned in longitudinal alignment with each other to produce a pleasing streamline effect across the lenses and the mounting in general is constructed to be desirable both from the standpoint of appearance and utility.

In Figures V and VII there is shown a slight modification wherein a differently constructed main bridge member is shown. The main bridge member in this instance is provided with a central arch portion 25 which is shaped to the contour of the nose and which is provided with downwardly extending side portions 26 behind which the main supporting arms 6 are positioned. The main bridge portion in this instance does not have the adjustable loops 3 such as shown in Fig. IV. The mounting otherwise is substantially identical to that shown and described above, that is, the depending portions 26 are secured to the arms 6 by solder or like means as indicated at 27. The loop portions 12 in this instance are provided with downwardly extending portions 28 which terminate in depending attaching ends 29 to which the nose pads or guards 30 are attached.

Attention is directed to the fact that the depending portions 26 extend downwardly substantially normal to the central arch portion 25 and are positioned inwardly of the ends of said portion 25. The remaining structure is otherwise substantially identical with the structure shown in Figs. I to IV inclusive.

Attention is also directed to the fact that the depending portions 5 and 26 of each of the structures shown and described above are angled relative to each other and to taper towards each other at the top. This is to cause them to blend with the angle of the sides of the nose when on the face of the wearer and to provide means for apparently decreasing the width of the central portions of the bridges.

It is apparent that the central arch portions 1 and 25, may be raised or lowered during the forming of the mounting to obtain various different heights of bridges with the same parts by attaching the lower ends 10 of the support 6 at varying positions longitudinally of the depending portions 5 and 26. This will have the effect of lowering or raising the arch portion 1 of the bridge member as desired with relation to the nose guards without changing the position of the lenses relative to the eyes of the wearer. The raising and lowering of the central arch portion 1 in the structure shown in Figs. I to IV inclusive may also be accomplished by adjustment of the loop portions 3 and rearwardly extending portion 4. In forming this adjustment the loop portions 3 or portions 4 are turned upwardly or downwardly as desired to raise and lower the arch portion 1.

The angle of the vertical parts 5 and 26, which taper upwardly, give the optical effect of narrowing the arch portion 1 of the bridge member. These parts make the arches of the bridges appear shorter than they actually are.

From the foregoing description it will be seen that I have provided simple, efficient and economical means and methods of obtaining all the objects and advantages of the invention, particularly that of providing a mounting which will have a wide range of adjustments so that a single mounting may be adjusted to the requirements of most individuals and in which the adjustable parts of said mounting will be substantially invisible and inconspicuous when on the face of the wearer.

Having described my invention, I claim:

1. A bridge member for connecting the lenses of an ophthalmic mounting comprising a central arch portion having relatively long depending side portions extending downwardly substantially in the plane of the lenses and tapering outwardly relative to each other, said side portions having adjustable supporting members extending rearwardly and portions extending upwardly in the rear of and from adjacent their lower ends, said upwardly extending portions being shaped substantially to the contour of the lenses when viewed from the front and terminating adjacent their upper ends in forwardly extending portions for attachment to lens holding means and said rearwardly extending portions terminating in nose guard attaching means.

2. A bridge for connecting the lenses of an ophthalmic mounting comprising a central arch portion turning rearwardly adjacent its ends to loops which turn forwardly and terminate in depending side members, said side members having adjustable supporting portions extending rearwardly and portions extending upwardly in the rear of and from adjacent their lower ends, said upwardly extending portions being shaped substantially to the contour of the lenses when viewed from the front and having forwardly extending portions adjacent their upper ends for attachment to lens holding means, and said rearwardly extending portions terminating in nose guard attaching means.

3. A bridge for connecting the lenses of an ophthalmic mounting comprising a central arch portion curving rearwardly adjacent its ends to loop portions, said loop portions having forwardly extending members which are deflected sidewise and downwardly to form depending front pieces lying substantially in a vertical plane, said front pieces having adjustable portions extending rearwardly and portions extending upwardly from adjacent their lower ends, said upwardly extending portions being shaped substantially to the contour of the lenses and so that their major portions will lie behind the front pieces when viewed from the front and being formed with forwardly extending portions adjacent their upper ends for attachment to lens holding means, and said rearwardly extending portions terminating in nose guard attaching means.

4. A bridge for connecting the lenses of an ophthalmic mounting comprising a central portion curving rearwardly adjacent its ends to loops which lie substantially in a vertical plane, said loops having a portion extending forwardly and terminating in relatively long depending side members, said side members having adjustable supporting portions extending upwardly in the rear of and from adjacent their lower ends and terminating in forwardly extending portions for attachment to lens holding means, said supporting portions also having a part extending rearwardly from adjacent the lower end of each depending side member and being shaped to a loop lying substantially in a horizontal plane and having a forwardly extending portion which terminates in nose guard attaching means.

5. A bridge for connecting the lenses of an ophthalmic mounting comprising a central arch portion curving rearwardly adjacent its ends to loop portions which lie substantially in a vertical plane and turn forwardly with members which are deflected sidewise and downwardly to form frontpieces lying substantially in a vertical plane and substantially normal to the plane of the loops, said front pieces having adjustable supporting portions extending rearwardly and portions extending upwardly from adjacent their lower ends, said upwardly extending portions being shaped substantially to the contour of the lenses when viewed from the front and having forwardly extending portions adjacent their upper ends for attaching the lens holding means, and said rearwardly extending portions terminating in nose guard attaching means.

6. A bridge for connecting the lens holding means of an ophthalmic mounting comprising a central portion having rearwardly extending end portions shaped substantially to the curve of the bridge of the nose and terminating in forwardly extending portions which deflect toward each other and progress outwardly substantially to the plane of the front of the central portion wherein they turn sidewise and downwardly to form depending side portions lying substantially in a vertical plane and substantially in line with the front of the central portion, said depending side portions having adjustable supporting members extending rearwardly and members extending upwardly from adjacent their lower ends, said upwardly extending members being shaped substantially to the contour of the lenses when viewed from the front and having forwardly extending portions adjacent their upper ends for attaching the lens holding means and said rearwardly extending members terminating in nose guard attaching means.

7. A bridge for connecting the lens holding means of an ophthalmic mounting comprising a central arch portion curving rearwardly adjacent its ends to loop portions which lie substantially in a vertical plane and are shaped substantially to the curve of the bridge of the nose, said loop portions terminating in forwardly extending portions which deflect toward each other and progress outwardly substantially to the plane of the front of the central arch portion wherein they turn sidewise and downwardly to form depending side portions lying substantially in a vertical plane and substantially in line with the front of the arch portion, said depending side portions having adjustable supporting members extending upwardly and members extending rearwardly from adjacent their lower ends, said upwardly extending members being shaped substantially to the contour of the lenses when viewed from the front and having forwardly extending portions adjacent their upper ends for attaching the lens holding means, and said rearwardly extending members terminating in nose guard attaching means.

8. A bridge for connecting the lens holding means of an ophthalmic mounting comprising a central portion having rearwardly extending end portions shaped substantially to the curve of the bridge of the nose and terminating in loops having forwardly extending portions which progress outwardly substantially to the plane of the front of the central portion wherein they turn sidewise and downwardly to form depending side portions lying substantially in a vertical plane and substantially in line with the front of the central portion, said depending side portions having adjustable supporting members extending rearwardly and members extending upwardly from adjacent their lower ends, said upwardly extending members being shaped substantially to the contour of the lenses and terminating in means for attachment to lens holding means and said rearwardly extending portions terminating in nose guard attaching means.

9. A bridge member for connecting the lenses of an ophthalmic mounting comprising a central arch portion having relatively long depending side portions extending downwardly from said central arch portion, said side portions having adjustable supporting members extending rearwardly and portions extending upwardly from the rear of said long depending portions, said upwardly extending portions being shaped substantially to the contour of the lenses when viewed from the front and terminating adjacent their upper ends in forwardly extending portions for attachment to lens holding means and said rearwardly extending portions terminating in nose guard attaching means.

10. A bridge member for connecting the lenses of an ophthalmic mounting comprising a central arch portion having relatively long depending side portions extending downwardly from said central arch portion, said side portions having adjustable supporting members extending rearwardly and portions extending upwardly from a point intermediate their ends, said upwardly extending portions being shaped substantially to the contour of the lenses when viewed from the front and terminating adjacent their upper ends in portions for attachment to lens holding means and said rearwardly extending portions terminating in nose guard attaching means.

EDWARD M. SPLAINE.